United States Patent

[11] 3,543,802

| [72] | Inventors | Wilbur R. Leopold, Jr.;<br>Lynn D. Edwards; John J. Smith, Decatur,<br>Illinois |
|---|---|---|
| [21] | Appl. No. | 781,450 |
| [22] | Filed | Dec. 5, 1968 |
| [45] | Patented | Dec. 1, 1970 |
| [73] | Assignee | Mueller Co.<br>Decatur, Illinois<br>a corporation of Illinois |

[54] PIPELINE STOPPER ASSEMBLY
9 Claims, 5 Drawing Figs.

[52] U.S. Cl. ................................................... 138/94,
138/97, 251/158
[51] Int. Cl. .................................................. F16l 55/12,
F16l 55/18
[50] Field of Search .......................................... 138/94, 97;
251/158, 187

[56] References Cited
UNITED STATES PATENTS
| 2,696,966 | 12/1954 | Mueller et al. | 138/94X |
| 3,130,951 | 4/1964 | Smith | 138/94X |
| 3,155,369 | 11/1964 | Wright et al. | 138/94X |
| 3,405,739 | 10/1968 | Smith | 138/97 |

Primary Examiner—Charles J. Myhre
Attorney—Cushman, Darby and Cushman

ABSTRACT: A pipeline stopper of the expanding sleeve type adapted to be inserted into a transverse circular cutout portion of a pipe and expanded to stop the flow therethrough. The pipeline stopper is provided with actuating means to positively expand and contract the sleeve and includes a plurality of toggle arms connected between the sleeve and at least one member movable longitudinally of the sleeve. A positive stop is provided to limit the pivotal movement of the arms to an angle no greater than 90° to the longitudinal axis of the stopper assembly thereby preventing the arms from inadvertently contracting the sleeve when the member is being moved in one direction.

INVENTORS
WILBUR R. LEOPOLD JR.
LYNN D. EDWARDS
JOHN J. SMITH
BY Cushman, Darby & Cushman
ATTORNEYS

PIPELINE STOPPER ASSEMBLY

The present invention relates to pipeline stopper assemblies of the expanding sleeve type adapted to be inserted into a transverse circular cutout portion of a pipe and expanded to stop flow of fluid therethrough. More particularly, the present invention relates to improvements in the actuating means for positively expanding and contracting the sleeve of stoppers of the general type disclosed in U.S. Pat. No. 3,155,369, issued Nov. 3, 1964, to Wright et al., and U.S. Pat. No. 3,405,739, issued Oct. 15, 1968, to John J. Smith.

Prior art pipe stoppers of the character disclosed in the aforementioned Wright et al. patent utilized sets of angularly spaced toggle arms connected between the expanding sleeve and a member movable coaxially of the sleeve. The member movable coaxially of the sleeve was threadedly engaged with a jackscrew and rotation of the jackscrew effected movement of the member on in one direction or the other on the jackscrew. The toggle arms were caused to pivot, depending on the direction of movement, to either expand or contract the expansion sleeve but when the member was moved in a direction to cause expansion of the sleeve there was no means provided to prevent either overexpansion of the sleeve or movement of the toggle arms past the center which would in turn cause the sleeve to start to contract. Since the stoppers are inserted and removed from a pipe by what is known in the trade as "stopping machines" such as shown in U.S. Pat. No. 3,046,645, issued July 31, 1962, to John J. Smith, the operator in the field could insert the stopper into a pipe and in his effort to expand the same, he could inadvertently cause the stopper to expand to its maximum and then be contracted, thus resulting in not providing a stoppage of the flow of fluid through the pipe. Improper sealing of the opening in the pipe could have disasterous effects resulting in danger to personnel, loss of time, and increased expenses. In an attempt to obviate the problem of a pipeline stopper being expanded beyond its maximum and inadvertently contracted, the length of the toggle arms was increased for a particular size stopper to be used with a particular size pipe. However, this measure did not provide a solution to the problem as it resulted in installation difficulties as oftentimes there was accidental expansion of the pipeline stopper prior to seating in the pipeline and, additionally, it oftentimes resulted in damage to the sealing surface of the sleeve due to overexpansion by the operator of the stopping machine.

Accordingly, an important object of the present invention is to provide an improved pipeline stopper and, more particularly, an improved actuating means for the expandable cylindrical sleeve of such stopper which will insure that such sleeve cannot be inadvertently contracted or inadvertently overexpanded in a particular size pipe to cause damage to the seating surface of the stopper.

Another object of the present invention is to provide an improved actuating means of the toggle arm type in which the arms for expanding the sleeve of the stopper are limited in their pivotal movement to an angle no greater than 90° to the longitudinal axis of the stopper assembly, thereby insuring positive and proper operation for a particular size stopper when used with a particular size pipe.

A further object of the present invention is the provision of a longitudinally split expandable and contractible metal sleeve having improved actuating means which apply expanding pressure uniformly over longitudinal areas of the sleeve rather than at particular points on the sleeve.

Ancillary to the preceding objects, it is a further object of the present invention to provide an improved stopper assembly having longer life and which minimizes danger of servicing pipelines under high flow conditions and/or high pressures, especially when such pipelines convey combustible fluids such as gas or the like.

These and other objects, advantages and novel features of the present invention will become more apparent in the following specification and claims taken in connection with the accompanying drawings in which:

Figure 1:
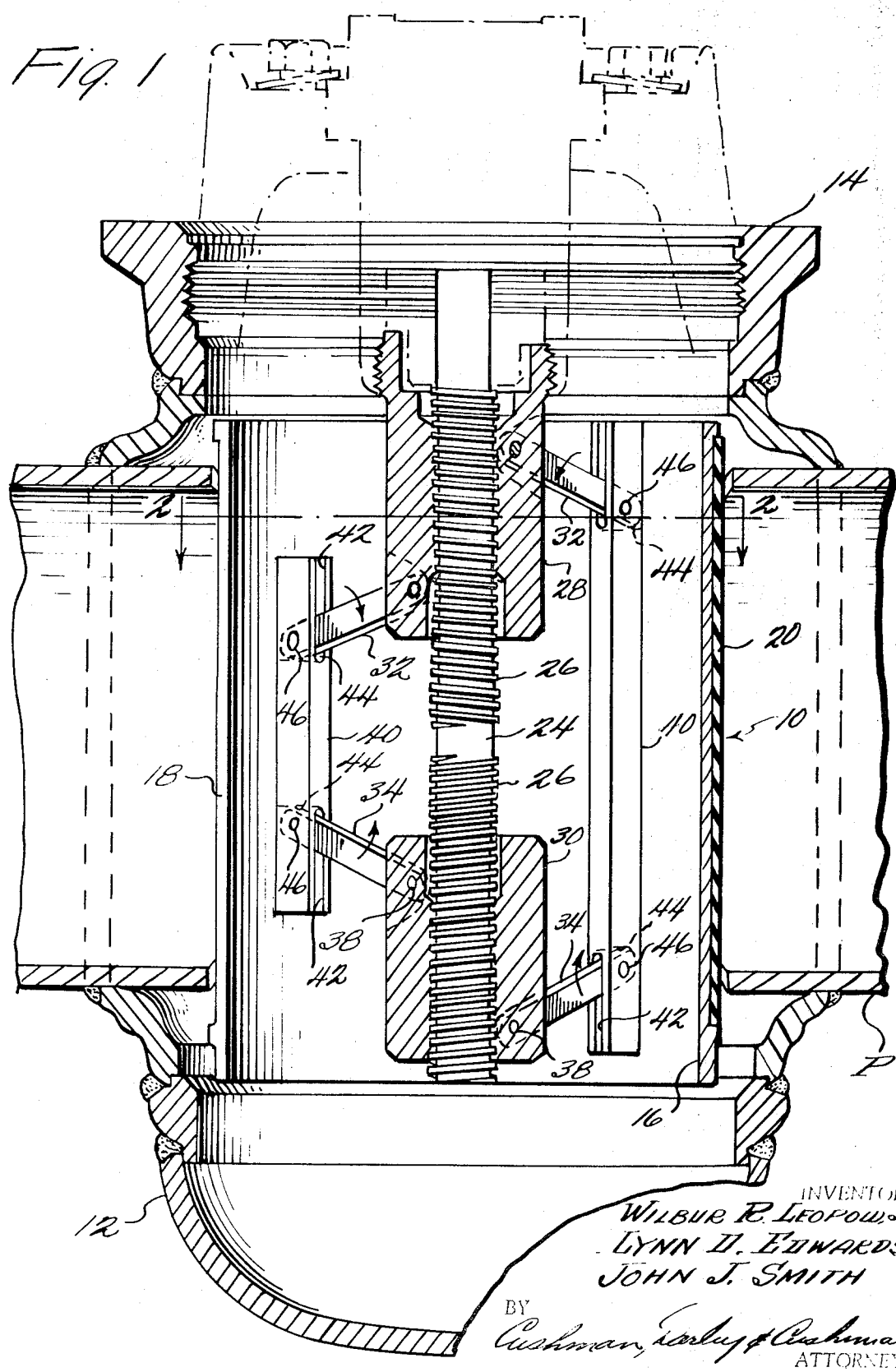
FIG. 1 is a vertical sectional view of a pipeline stopper assembly embodying the improvements of the present invention, the stopper assembly being illustrated in operative association with a pipeline just prior to expansion into flow stopping position.
Figure 2:
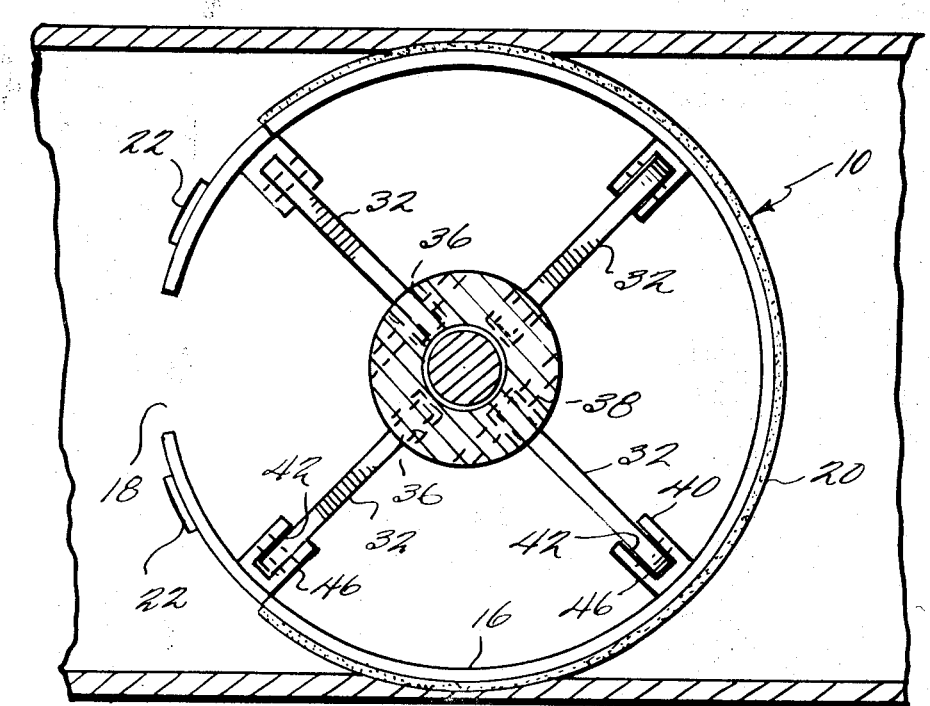
FIG. 2 is a sectional view taken substantially on the line 2-2 of FIG. 1.

Referring now to the drawings and in particular to FIGS. 1 and 2 wherein like or similar character or reference numerals represent like or similar parts, the pipeline stopper assembly of the present invention is generally designated by the numeral 10 and is shown positioned within a transverse opening cut out of a pipe P. As is well known in the art, when it is decided to provide a stopper to shut off the flow of fluid in the pipe or main P, a stopper fitting 12 is welded or otherwise suitably secured to the pipe. The fitting 12 is provided with an interiorly threaded mouth 14 disposed radially thereof for use in receiving a stopper plug 13 which may be part of the stopper assembly if the assembly is a "deferred" stopper assembly. A suitable drilling and stopping machine (not shown) is secured to the mouth 14 in any suitable manner and by known methods the pipe P is cutaway to provide a circular opening therethrough within the stopper fitting 12. The stopper assembly 10 is then inserted into the opening and expanded into engagement with the edges thereof to provide for the blockage of flow of fluid through the pipe P.

The pipeline stopper assembly 10 includes a cylindrical sleeve 16 which is provided with a longitudinal slot 18. Sleeve 16 is preferably constructed of a somewhat springy metal, such as sheet metal or the like. The outer surface of the sleeve 16 may be provided with a flexible cover 20 made of rubber or other suitable gasket material capable of engaging with the edges of the cutout portion of the pipe P so as to provide a seal therewith. Additionally, the outer surface of the sleeve 16 may be provided with a pair of elongated longitudinally extending wear strips 22 made of steel or the like. The longitudinally split sleeve 16 thus far described is sufficient for the description of the present invention as there is a full disclosure of the same in the aforementioned Smith U.S. Pat. No. 3,405,739.

Coaxially disposed within the sleeve 16 of the stopper assembly 10 is a jackscrew 24 having two sets of threads 26 of opposite direction on which are mounted nut members 28 and 30 respectively for opposite axial movement. The nut members 28 and 30 are each provided with a set of equilength, generally radially extending, and substantially uniformly angularly spaced toggle arms 32 and 34 respectively, the number of arms in each set depending on the size of the stopper assembly 10. The nut members 28 and 30 are provided with angularly spaced apart radially inwardly extending elongated slots 36 for receiving the ends of the sets of arms 32 and 34, the slots having pivot pins 38 extending therethrough and on which the arms 32 and 34 may freely pivot in a restrained movement of a single plane.

The interior surface of the sleeve 16 has welded or otherwise suitably secured thereto a plurality of elongated longitudinally extending bars 40, there being the same number of bars as arms in a set. The bars 40 are angularly spaced and each bar 40 is provided at each of its ends with a radially extending slot 42 on its inner face for receiving the opposite ends of the arms 32 and 34 respectively. In more detail, and referring specifically to FIG. 3, the slots 42 in the bars 40 are milled so that they are provided with a transversely extending end wall 44. Pivot pins 46 extending through the bars 40 transversely across the slots 42 pivotally receive the opposite ends of the arms 32 and 34. The end walls 44 for the slots 42 are so positioned with respect to each of the slots 42 and the location of the pivot pins 46 that they will be engaged by the edge of the arms 32 or 34 when the arms approach a predetermined point of extension. In other words, the end walls 44 are arranged so that they do not permit the arms to go past center or extend to an angle greater than 90° with respect to the longitudinal axis of the stopper assembly 10.

As will be appreciated, FIG. 1 illustrates each of the slots 42 in each of the bars 40 having an end wall discriminately positioned to act as a stop for the particular arms 32 or 34 pivoted thereto. However, it will further be understood that it is only necessary to provide one of the slots 42 with an end wall 44 because if pivotal movement is limited for one of the arms 32 or 34, it in effect limits further movement of the remaining arms.

The stopper assembly 10 illustrated in FIG. 1 is a "deferred" stopper but it will be appreciated that such a stopper assembly could be a "regular" stopper. In either case, the stopper assembly is operated to either expand or contract the sleeve 16 in a similar manner. In more detail, the stopping machine (not shown) is provided with a suitable manipulating rod (not shown) for coupling to the jackscrew 24. Through rotation of the manipulating rod, the jackscrew 24 is in turn rotated and upon rotation of the jackscrew, the nut members 28 and 30 move relative to one another in opposite directions axially of the sleeve 16. As shown in FIG. 1, the stopper assembly 10 has been inserted into a circular opening of the pipe P but has not been expanded into sealing engagement with the edges of the opening. By rotating the jackscrew in a particular direction to cause the nut members 28 and 30 to move toward each other, the toggle arms 32 are pivoted downwardly about their pivots 46 whereas the toggle arms 34 are pivoted upwardly about their pivots 46. This in turn will cause the sleeve 16 to expand radially outwardly and the nuts may continue to move together until the arms 32 and/or 34 engage the end walls 44 of the slots 42. This limits the maximum expansion of the sleeve 16 and insures that the nuts 28 and 30 cannot move further toward one another to a position where the arms 32 and 34 swing past dead center and begin to contract the sleeve 16.

By having the elongated bars 40 for pivotally supporting the ends of the arms 32 and 34, a uniform pressure is applied longitudinally to the sleeve when expanding the same, thus providing for a more uniform application of pressure by the sleeve to the edges of the opening in the pipe P. Additionally, such bars 40 provide a certain amount of rigidity to the sleeve 16 without interfering with its ability to expand and contract.

Figure 4:
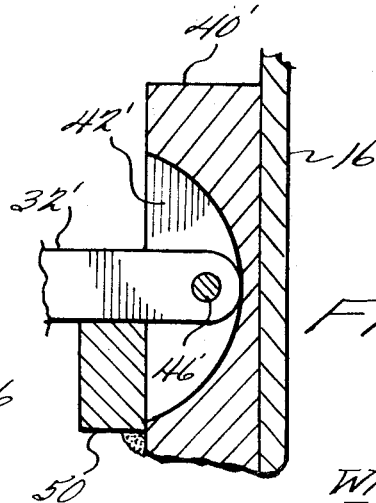
FIG. 4 is a view similar to FIG. 3 but illustrating a further modification of the stop means.
Figure 5:
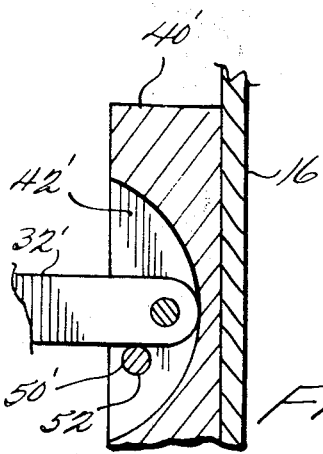
FIG. 5 is a view similar to FIG. 3 and illustrating a still further modification of the stop means of the present invention.

Referring now to FIGS. 4 and 5 of the drawings, modifications of the stop means for the arms 32 and/or 34 are disclosed. These modifications enable stopper assemblies 10 already in use and not incorporating means for limiting the angular movement of the toggle arms to be converted in the field. As shown in FIG. 4, the arm 32' is pivotally connected to the bar 40' by means of a pivot pin 46' extending through the bar and through an elongated radially extending slot 42'. To provide a stop for the arm 32', a steel block or strip 50 is welded to the bar 40', the block or strip 50 extending across a portion of the slot 42 so as to provide a travel limit lug. The positioning of the block 50 is such that the arm 32' can pivot relative to the longitudinal axis of the stopper assembly 10 to an angle no greater than 90°.

Referring to FIG. 5, the arm 32' is pivotally connected in the slot 42' of bar 40' in identical manner to that shown in FIG. 4. However, rather than welding a block 50 to the bar 40', the travel limiting lug may be in the form of a roll pin 50' inserted into holes 52 drilled through the bar 40'. The pin 50' extends transversely across the slot 42' at a discriminate position to limit the angle of movement of the arm 32' to an angle which is no greater than 90°.

Figure 3:
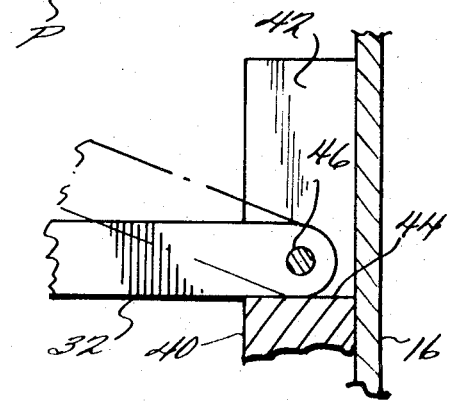
FIG. 3 is an enlarged fragmentary sectional view through a pivotal connection of one of the toggle arms of the stopper assembly of the present invention and illustrating one form of means for limiting the pivotal movement of such toggle arm.

In the various modifications shown in FIGS. 3 through 5 inclusive, it will be appreciated that the limiting lug or stop is illustrated as permitting maximum expansion of the sleeve 16. Of course, it is within the scope of the present invention to discriminately locate the stop means at a predetermined desired angle less than 90° if this is required by particular design criteria of the stop assembly. Further, it will be noted that the stops are provided on the connection of the arms to the sleeve but it will now be apparent the stops could be incorporated in the nut members.

The novel stopper assembly and improved actuating means therefor described and illustrated in the drawings fully and effectively accomplish the objects and advantages of the present invention. However, it will be understood that the foregoing specific embodiments have been shown and described only for the purpose of illustrating the principle and invention and are subject to some changes and modifications without departing from the scope of the invention.

Therefore, the terminology used throughout the specification is for the purpose of description and not limitation, the spirit and scope of the invention being described in the appended claims.

We claim:

1. In a cylindrical pipe stopper assembly having a cylindrical expansion sleeve for insertion into a transverse circular opening through a pipeline, the sleeve being adapted to be positively expanded into sealing engagement with edges of the opening and positively contracted out of sealing engagement, an improvement in actuating means for positively expanding and contracting said sleeve comprising a member mounted for movement coaxially of the sleeve; a jackscrew threadedly engaged with said member for executing movement thereof; at least a pair of angularly spaced toggle arms each pivotally connected to said member and to said sleeve whereby movement of said member in one direction positively expands said sleeve and movement of said member in the opposite direction positively contracts said sleeve; means to restrain relative rotation between said member and said sleeve; and stop means engageable by at least one of said arms to limit pivotal movement of the same to an angle no greater than 90° to the longitudinal axis of the stopper assembly thereby preventing said arm from pivoting past a center by continued movement of said member in a sleeve expanding direction.

2. A cylindrical pipe stopper assembly as claimed in claim 1 wherein at least one of said member and said sleeve is provided with a longitudinally extending slot in which an end of one of said arms pivots, said slot restraining movement of said one arm to a single plane.

3. A cylindrical pipe stopper as claimed in claim 2 in which said stop means includes a roll pin extending transversely across said slot and engageable by the said one arm to limit pivotal movement.

4. A cylindrical pipe stopper assembly as claimed in claim 2 in which said stop means includes a block member secured to said at least one of said member and said sleeve having the slot, said block member being positioned in the path of movement of said one arm for engagement thereby to limit pivotal movement.

5. A cylindrical pipe stopper assembly as claimed in claim 2 in which said stop means includes providing said slot with a milled end wall extending transversely of the slot and engageable by said one arm to limit pivotal movement.

6. A cylindrical pipe stopper assembly adapted to be inserted into, and having a minimum outer diameter less than a transverse circular opening through a pipeline, and adapted to be expanded into sealing engagement with the edges of the opening comprising: a longitudinally split cylindrical sleeve having a gasket material on at least a portion of its outer surface, said sleeve further having a plurality of angularly spaced longitudinally extending bars secured to its inner surface, each of said bars having a slot adjacent each end thereof; a jackscrew; a pair of members threadedly mounted on said jackscrew for movement toward and away from each other; a first set of angularly spaced toggle arms pivotally connected to one of said members and to said bars in the slots adjacent one end of the same, and a second set of angularly spaced toggle arms pivotally connected to the other of said members and to said bars in the slots at the other end of the same whereby movement of said members relative to each other expand and contract said sleeve; and stop means engageable by at least one arm of one of said sets to limit pivotal movement of said arms to an angle no greater than 90° to the longitudinal axis of the stopper assembly, thereby preventing said arms from pivoting past a center by continued movement of said members in a sleeve expanding direction.

7. A cylindrical pipe stopper assembly as claimed in claim 6 in which said stop means includes a roll pin extending through one of said bars transversely across one of the slots therein and engageable by the at least one arm to limit pivotal movement.

8. A cylindrical pipe stopper as claimed in claim 6 in which said stop means includes a block member secured to the inner face of one of said bars and extending across one of the slots therein, said block member being positioned in the path of movement of the at least one arm for engagement therewith to limit pivotal movement.

9. A cylindrical pipe stopper assembly as claimed in claim 6 in which said stop means includes providing one of the slots in one of said bars with at least one milled end wall extending transversely of the slot, said end wall being positioned to be engaged by the at least one arm to limit pivotal movement.